US007852765B2

(12) United States Patent
Neuman et al.

(10) Patent No.: US 7,852,765 B2
(45) Date of Patent: Dec. 14, 2010

(54) ACTUATOR CONTROL METHOD

(75) Inventors: Serge Neuman, Seynod (FR); Michel Fournet, Cuvat (FR); Florent Pellarin, Saint-Martin Bellevue (FR)

(73) Assignee: Somfy SAS, Cluses (FR)

( * ) Notice: Subject to any disclaimer, the term of this patent is extended or adjusted under 35 U.S.C. 154(b) by 1144 days.

(21) Appl. No.: 11/360,302

(22) Filed: Feb. 23, 2006

(65) Prior Publication Data

US 2006/0203726 A1 Sep. 14, 2006

(30) Foreign Application Priority Data

Mar. 4, 2005 (FR) .................................. 05 02193

(51) Int. Cl.
*H04L 12/26* (2006.01)
*H04M 3/00* (2006.01)
*H04B 1/06* (2006.01)

(52) U.S. Cl. ....................... 370/232; 370/338; 455/352; 455/420; 375/362

(58) Field of Classification Search ......... 370/310–338, 370/464–509, 230–238; 375/354, 362; 455/420, 455/5.1, 11.1, 352, 418, 419, 422.1; 340/5.64, 340/5.7, 5.72, 825.63
See application file for complete search history.

(56) References Cited

U.S. PATENT DOCUMENTS 4,569,062 A * 2/1986 Dellande et al. ............ 375/370
4,894,823 A 1/1990 Adelmann et al. ............ 370/60
5,090,029 A * 2/1992 Yamamoto et al. .......... 375/356
5,469,152 A * 11/1995 Yamamoto et al. ..... 340/825.63
6,359,399 B1 3/2002 Omenigrandi ............... 318/16
6,449,290 B1 9/2002 Willars et al. ............... 370/507
2002/0062160 A1* 5/2002 Hellwig ....................... 700/78
2002/0109676 A1 8/2002 Pochmuller et al. .......... 345/169
2002/0164029 A1 11/2002 Jiang .......................... 380/270
2003/0183183 A1* 10/2003 Yamaki et al. ........... 123/90.11
2005/0140316 A1 6/2005 Orsat .......................... 318/16
2006/0104601 A1* 5/2006 Arora et al. ................... 386/46
2006/0247872 A1* 11/2006 Boutin ........................ 702/58

FOREIGN PATENT DOCUMENTS

EP 20022097879 4/2002
JP 2003/294631 10/2003
WO WO 03/083802 A 10/2003

* cited by examiner

*Primary Examiner*—Afsar M. Qureshi
(74) *Attorney, Agent, or Firm*—Frommer Lawrence & Haug LLP; Ronald R. Santucci

(57) ABSTRACT

A synchronized control method for actuators driving a moving device includes the sending of a signal repeating a frame including the code of the control to be executed, inserting into the frame sent a time information item representative of the control generation duration, extracting the time information item and computing at least one of the application start and the application end instant of control, and the reception of the signal for application of the control to the actuator as long as the generation of the control signal lasts.

12 Claims, 4 Drawing Sheets

Fig. 1
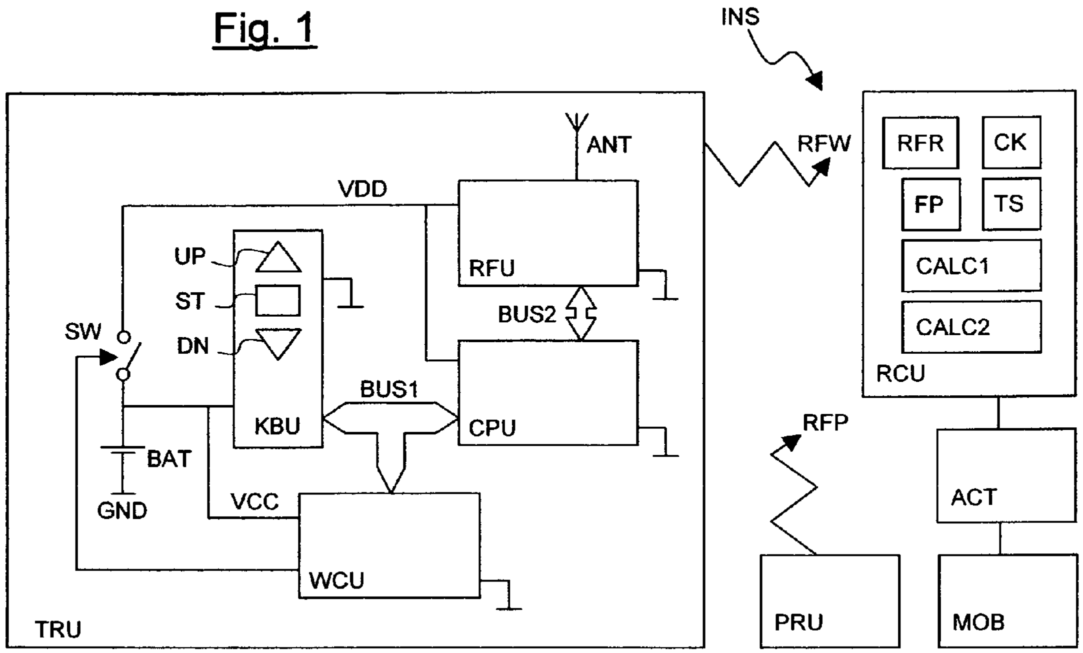
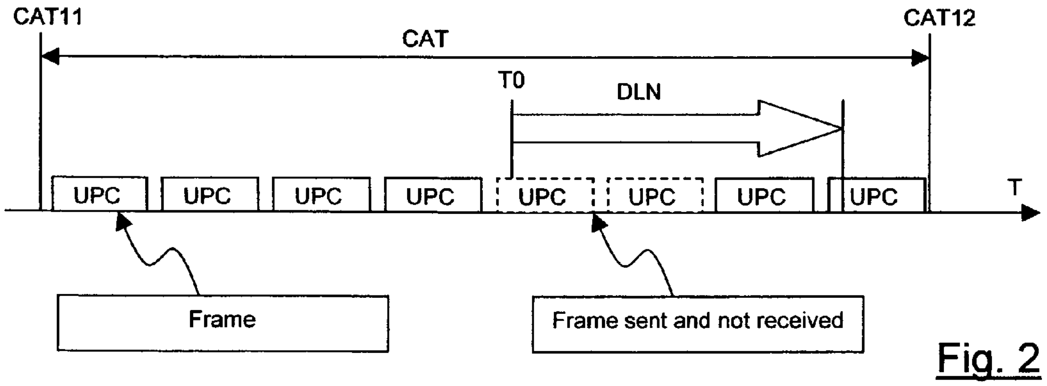
Fig. 2

ACTUATOR CONTROL METHOD

This application claims priority benefits from French Patent Application No. 05 02193 filed Mar 4, 2005.

BACKGROUND OF THE INVENTION

The invention relates to the field of wireless, radio frequency remote control of actuators driving a moving device of the building of closure (door, gate or window), solar protection, multimedia projection screen, or ventilation door type.

More specifically, the invention relates to a synchronized control method for actuators driving a moving device of the building of closure (door, gate or window), solar protection, multimedia projection screen, or ventilation flap type, a control correction method, a programming method and an installation for controlling such actuators.

The object of the invention is to provide a faster and more uniform reaction of the actuators, including in situations of radio environments disturbed by stray signals or by a range limit distance.

The invention applies in particular to the case of remote control transmitters and receivers for which pressing a control key on the transmitter provokes the repeated sending of a signal containing, in a frame, a number of information items including that of the control activated. The sending duration conditions an action performed by the remote control receiver. The other information items contained in the frame are, for example, an identifier enabling the remote control receiver to recognize the transmitter, and therefore to interpret and/or execute the command if it is an authorized transmitter. It can also be a rolling code.

DESCRIPTION OF THE PRIOR ART

An example of operation by prolonged pressing on a radio remote control key is given in U.S. Pat. No. 6,359,399, the content of which is herein incorporated by reference, column 5, lines 33-48: the activation of the actuator by the receiver takes place when the latter receives a signal, and for its part, the transmitter transmits said signal as long as the user is pressing on a control button.

However, one problem associated with radio transmission is the possibility of interference resulting in poor reception of a signal sent. It appears that patent application JP 2002-97879 (Sanwa) describes a similar issue.

Furthermore, and without it being an interference issue, there is also the problem in such installations of a transmitter intended for overall control of a number of receivers. Some of these remote receivers can be at the range limit, and the likelihood of failure to receive certain repeated frames becomes high.

The most significant consequences of poor reception are then particularly apparent in the case of operation of a set of products: for example, all the actuators do not start simultaneously if those connected to receivers remote from the transmitter do not correctly receive the first frame or frames. Similarly, probably the same products risk being switched off prematurely if the last frames are not received correctly. Whereas the problem is virtually imperceptible in the case of a unitary control, it is clearly revealed by the differences in positioning between moving products in a general control situation. The result is a source of visual dissatisfaction for users, and even more so for architects, with their keen desire for facade harmony.

U.S. Pat. No. 5,469,152, the content of which is herein incorporated by reference, discloses a control device of an audio system in which a press on a control key is interpreted differently according to whether it is pressed for less than two seconds or longer than two seconds.

SUMMARY OF THE INVENTION

By remedying the abovementioned drawbacks, the invention also presents the advantage of enabling the installation to be programmed more quickly, when a professional installer has a dedicated programming tool.

The control method comprises:

- a step for inserting into the frame sent a time information item representative of the control generation duration,
- a step for extracting this time information item,
- a step for computing the application start and/or. application end instant of the control, using the time information item.

The time information item can be a frame number or a number representative of the control generation duration.

The step for computing the application start and/or application end instant of a control using the time information item can include a step for computing the theoretical control generation start instant and the control application start instant can be determined by applying a predetermined time offset to this instant.

The step for inserting into the frame sent a time information item representative of the control generation duration can also include the insertion of a control generation end indication and the step for computing the application start and/or application end instant of a control using the time information item can comprise:

- a step for activating the actuator according to the control received and for measuring the activation duration,
- a step for receiving a control generation end indication,
- a step for extracting data for determining the control generation duration until the end of control generation,
- a step for comparing the control generation duration up to the end of the control generation with the activation duration.

Depending on the result of the comparison step:

- a step for extending the control application duration can be undertaken when the activation duration is less than the control generation duration, or
- a correction step can terminate application of the current control and provokes the temporary application of a reverse effect control.

The duration of the extension step or the duration of the correction step is equal to the absolute difference of the quantities compared in the comparison step.

The method of programming for a unit for programming actuators driving a moving device of the building of closure (door, gate or window), solar protection, multimedia projection screen, or ventilation flap type includes the steps of the control method according to the invention, and the time information item contained in the initial frame presents a particular value.

In the programming method, the particular value can correspond to at least the duration of generation of a control needed to validate the reception of a programming control.

The installation comprises a radio frequency remote control transmitter, a radio frequency remote control receiver connected to an actuator driving a moving device of the building of closure (door, gate or window), solar protection, multimedia projection screen, or ventilation flap type, in which the prolonged press on a control key of the transmitter provokes the repeated sending of a frame containing the code of the control key pressed and in which the reception of said frames provokes an action of the receiver on the actuator related to the frame reception duration, wherein the transmitter includes a program inserting a time information item relating to the press duration in each frame relating to one and the same press on a control key of the transmitter and wherein the receiver includes a program extracting this time information item and using it to create the control to be applied to the actuator according to the method of the invention.

DESCRIPTION OF THE DRAWINGS

The invention and its various embodiments will be better understood from the description of the latter and of the appended figures in which:

FIG. 1 represents an installation in which the method according to the invention is used.

FIG. 2 represents an example of frame for sending a control.

DESCRIPTION OF THE PREFERRED EMBODIMENTS

Figure 3:
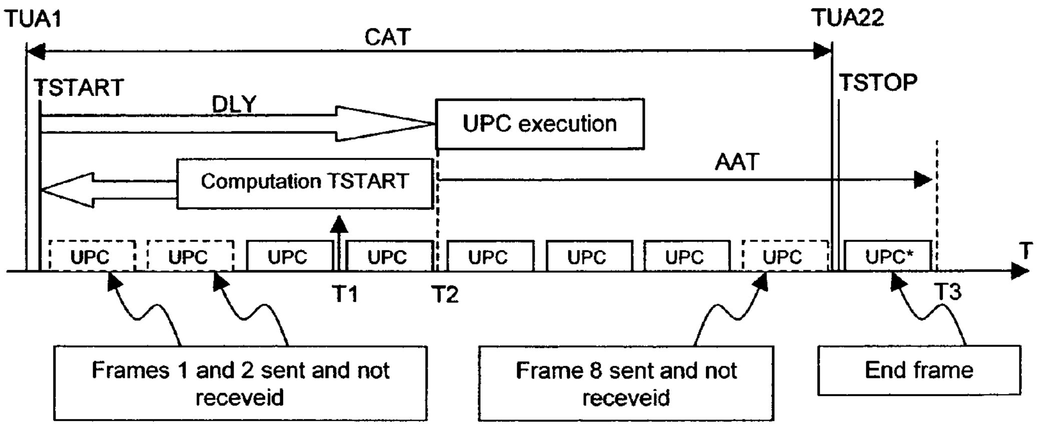
FIG. 3 represents a frame for sending in an installation according to the invention.

An INS installation in which the method according to the invention is used is first described with reference to FIG. 1.

The handheld remote control transmitter constitutes a transmission unit TRU comprising a control keypad KBU, a microcontroller CPU and a radio frequency transmitter RFU, provided with a sending antenna ANT. The keypad KBU has three control keys such as an up key UP, a stop key ST and a down key DN, acting, for example, on electrical contacts that are not shown. The keypad is connected to the microcontroller CPU by a first bus BUS1. The microcontroller is connected to the transmitter RFU by a second bus BUS2. The handheld remote control transmitter is powered by a battery BAT, the negative pole of which is connected to the electrical ground GND of the transmission unit TRU.

The keypad KBU is also connected, via the first bus BUSl, to a wake-up control unit WCU, the purpose of which is to activate the processing means formed by the microcontroller CPU and by the radio frequency transmitter RFU when a key of the keypad is pressed. In the assembly of FIG. 1, this unit provokes the closure of a switch SW linking the positive pole of the battery BAT to the positive power supply wire VDD of the processing means. Thus, the positive pole of the battery BAT is therefore connected permanently only to the positive power supply wire VCC of the keypad and of the wake-up control unit WCU.

In variants of the embodiment, known to those skilled in the art, the control unit is included in the same integrated circuit as the microcontroller or even acts on a microcontroller wake-up signal and/or of the transmitter rather than on their power supply. The transmitter can also be woken up in a second step by the microcontroller.

The signal sent by the antenna ANT constitutes a radio wave or signal RFW, which is sensed and interpreted by a reception unit RCU, which pilots an actuator ACT which drives a moving element of the building MOB. The reception unit is linked to the 230 V 50 Hz alternating current mains supply or to an electrical power source that is not shown.

The reception unit RCU comprises a radio frequency receiver RFR, a clock CK for computing time delays, various computation means CALC1 and CALC2 activated respectively at the start of reception and at the end of reception.

One and the same reception unit RCU can be controlled by different transmission units TRU and, conversely, one and the same transmission unit TRU can control a number of reception units RCU, in particular remote units, which raises the problems stated above.

Certain parameters of a reception unit can be adjusted from the transmission unit. For example, it is possible to enter into a particular programming mode by a particular press on the keys of the keypad. Thus, simultaneously pressing the up and down keys UP and DN provokes the repeated sending of a particular programming control PROG. When the reception unit RCU receives this control PROG for a duration longer than a given threshold (for example, 10 seconds), it enters into a programming mode. The programming mode relates, for example, to the memorizing of specific positions of the actuator ACT, such as the end-of-travel positions. The duration threshold is explained by the need to exclude any unwanted control (keying error, unit being played with by a child, etc.).

It is advantageous to be able to enter into a programming mode by using a standard transmission unit, such as TRU, that has few keys and is inexpensive to buy. It is, however, possible for the professional installer to have a more sophisticated programming unit, including, for example, dedicated programming keys. Thus, pressing just one of these keys sends the control PROG, via a radio signal. However, since it is the receiver, and not the transmitter, that checks that the duration of the control PROG is longer than the fixed threshold, there is no time saving for the installer. In the installation according to the invention, the installer has a programming unit PRU sending a radio signal RFP to overcome this drawback.

There is at least one operating mode of the installation in which the activation of the actuator is normally continued only as long as a control key is pressed and the signal corresponding to this control is sent, in a continuously repeated fashion.

FIG. 2 gives the example of such an action and diagrammatically represents the signal sent or received.

The control action of the user (pressing the UP key) begins at the instant CAT11 and ends at the instant CAT12 (releasing the UP key). The difference between these two instants represents the press duration CAT. During this duration, a frame containing the code of the up control UPC is sent repeatedly, for example every 140 milliseconds. The frame contains other binary information, such as an identification number ID of the transmission unit.

In FIG. 2, eight frames have been sent by the transmission unit TRU while the up control key UP is pressed. However, not all these frames are received by the reception unit RCU, if the latter is remote or if the transmission is affected by interference. The frames sent and not received are represented by broken lines. Such is the case with the frames 5 and 6 in the figure. Thus, at the instant T0, the reception unit notes that it is no longer receiving the signal, and initiates a time delay of duration DLN, in order to check that the signal has actually disappeared. The duration of this time delay can span a number of frames. In the case represented, the time delay DLN therefore makes it possible to avoid the effects of the break in transmission and obtain a reception duration very close to the actual press duration. Obviously, if no signal is received during the time delay DLN, then it is possible to apply a reverse direction operation corresponding to this duration that would then have wrongly extended the preceding operation. However, if the frames numbered 7 and 8 are not received, and not the frames numbered 5 and 6, then the method represented in FIG. 2 will deduce at best that the sending is completed on the sixth frame.

The invention makes it possible to remedy this type of drawback of the installation by appropriate methods and means for the insertion, recognition and operation of a time indication in the frame sent. This time information item is a frame number and/or a number representative of the press duration.

In itself, the technique of numbering frames for sending is known in the state of the art. U.S. Pat. No. 5,090,029, the content of which is herein incorporated by reference, uses such a numbering in a communication method sharing one and the same network resource with time slots allocated to the different participants, which is the specific feature of the so-called CDMA (Code Division Multiple Access) systems. The latter get their bearings from the frame number. As for U.S. patent application No. 2002/0164029 (corresponding to the U.S. Pat. No. 6,870,932, the content of which is herein incorporated by reference), it uses the frame number for encrypting or decrypting information, or quite simply to correctly reconstruct a complete message when it is divided into packets on transmission via different channels.

Also known from the state of the art is to provide a time indication (sending time or "time stamp") in a frame, in particular in packet-mode telecommunication cases. U.S. Pat. No. 6,449,290, the content of which is herein incorporated by reference, combines frame counting with time-oriented content. U.S. Pat. No. 4,894,823, the content of which is herein incorporated by reference, cited in the above patent, describes a network in which each packet of frames contains a start frame containing a time indication of entry into the node of the network and updated when forwarded by the network node.

FIG. 3 represents a stream of frames in the case of an installation according to the invention, the frames this time being provided with a time indication as will be seen in FIG. 4, described below. As in the case of FIG. 2, the press on the up control key UP begins at the instant CAP21 and ends at the instant CAP22. Eight frames are sent during this action on the part of the user in the example represented. However, there is poor reception for both the first two frames and the eighth frame.

According to a first embodiment, the invention is first used to enable good synchronization of all the actuators on startup. To overcome a possible transmission failure, the designer has provided for the startup of any actuator to take place at the end of the fourth frame sent (for a frame of 140 ms, this amounts to supporting a delay of around half a second). A time delay DLY is associated with this value.

At the instant T1, the receiver has therefore received its first frame. Based on the time indication contained in this frame, it computes the theoretical instant of the start of sending TSTART, close to the actual instant CAT21 of pressing on the control key. From the value of the time delay duration DLY, it computes the time remaining before activating the control UPC to be applied to the actuator. The durations can be expressed as a number of frames: for example, the duration DLY corresponds to an integer number NSTART of frame periods, in this case NSTART=4, but it is also possible to take a non-integer value. In practice, the time delay corresponds to a counter, the initial content of which is fixed not by the theoretical value of DLY but by this value minus the time already elapsed between TSTART and the instant T1 of processing of the first frame received.

Figure 5:
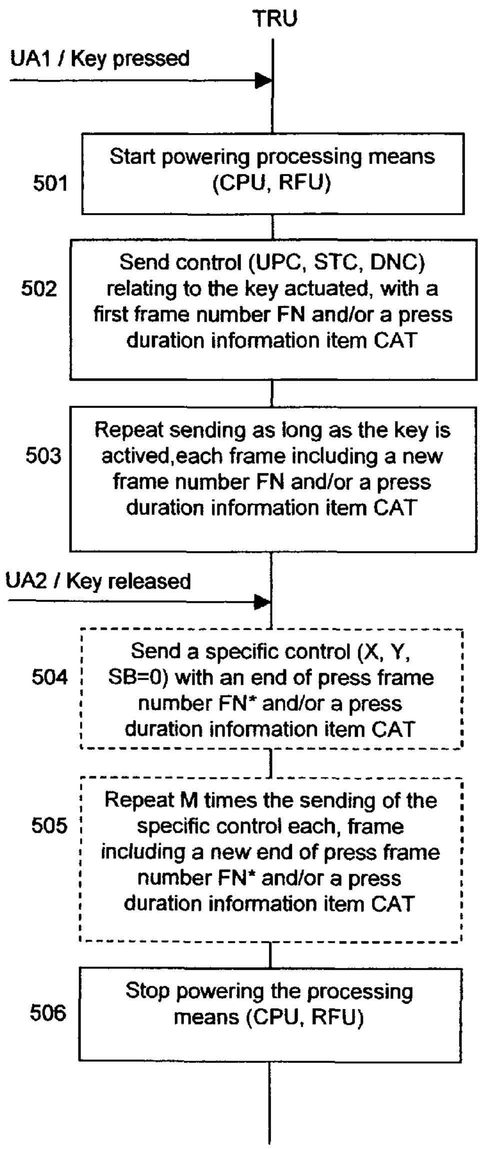
FIG. 5 represents a block diagram of the control method according to the invention.

FIG. 5 describes the control method according to the first embodiment of the invention in block diagram form. A first action on the part of the user UA1 (at the instant CAT11 or CAT21) consists in pressing on a control key of the keypad of the transmission unit TRU. The effect of this action is to power the processing means if it is a handheld unit and/or to wake up the microcontroller, in the step 501. In the step 502, a frame number FN is inserted into the content of the frame which contains the control corresponding to the key activated, and this frame is sent by means of the radio frequency transmitter RFU. Alternatively, a press duration information item CAT (possibly zero for the first frame) is inserted instead of a frame number. Alternatively, both information items are inserted into the content of the frame to be sent.

In the step 503, the step 502 is repeated as long as the control key is pressed. In the frames sent, only the frame number and/or the press duration therefore change from one frame to the next. Simply, the frame number is incremented by units, but another variation law is applicable, provided that it can be interpreted by the receiver.

A new action UA2 on the part of the user is to release the control key (at the instant CAT12 or CAT22). In a simple case, the transmission unit then goes directly to the step 506 which stops powering the processing means or switches to sleep mode.

However, a preferred embodiment of the invention consists in applying the step 504 in which a specific control frame is sent. This specific control frame contains a particular control code (X, Y) which is substituted for the code of the control sent (UPC, DNC), the code X being substituted for the code UPC and the code Y being substituted for the code DNC, to indicate that the key is released. Alternatively, the specific control frame maintains the code of the control previously activated, but contains a status change indicator SB. For example, the frame contains a bit SB in the 1 state as long as the key is pressed, and in the 0 state when the key is released.

The frame also contains an end of press frame number FN*. The number FN* can be set to 1, but it can also be equal to the frame number FN, counted from the start of sending. The end of press frame can also contain the press duration information item CAT.

In the step 505, the preceding step is repeated one or more times, with the end frame number FN* incremented. The press duration information item no longer changes in these repeated sendings. After a predetermined number M of sendings, the transmission unit goes to the step 506, which terminates the sending.

The invention, in its first embodiment, therefore favors the sending of one and preferably several frames after the control key has been released. This sending appears in FIG. 3 in the form of the frame UPC*. An end of press frame is distinguished from a control frame.

Figure 4A:
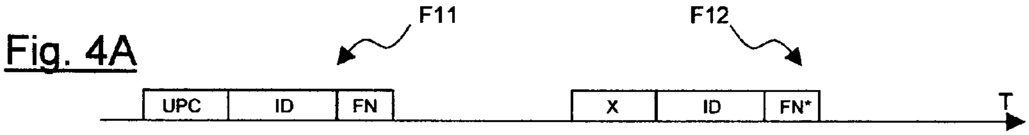
FIGS. 4A to 4D represent several control frames variants.

FIG. 4A represents a control frame F11 corresponding to the stream of frames sent while the up control key UP is pressed. The frame contains the code of the up control UPC, an identifier ID or other binary information necessary for authentication, and a frame number FN. FIG. 4A also represents a specific control frame F12 corresponding to the stream of frames sent while the up control key UP is released. The frame contains the code of the complementary control X of the up control UPC, and an end frame number FN*. The content of the end frame number is initialized with the control X or increments the last number FN of the control UPC.

Figure 4B:
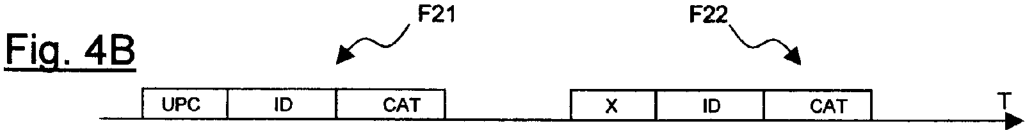

FIG. 4B represents a control frame F21 corresponding to the stream of frames sent while the up control key UP is pressed. The frame contains the code of the up control UPC, an identifier ID or other binary information necessary for authentication, and a press duration information item CAT, zero if it is the first frame. FIG. 4B also represents a specific control frame F22 corresponding to the stream of frames sent while the up control key UP is released. The frame contains the code of the complementary control X of the up control UPC, and the press duration information item (in this case constant) CAT.

Figure 4C:
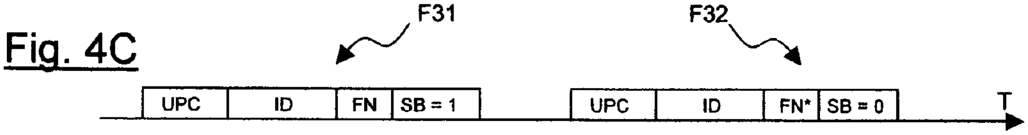

FIG. 4C differs from FIG. 4A in that the code of the control UPC contained in a control frame F31 is maintained in an end of press frame F32. However, the frame contains an indicator SB in the high state when there is a press, and in the low state when the press is released.

Figure 4D:
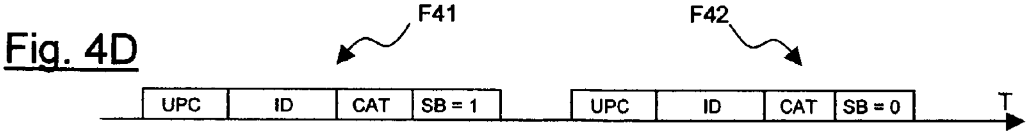

FIG. 4D differs in the same way from FIG. 4B.

Figure 6:
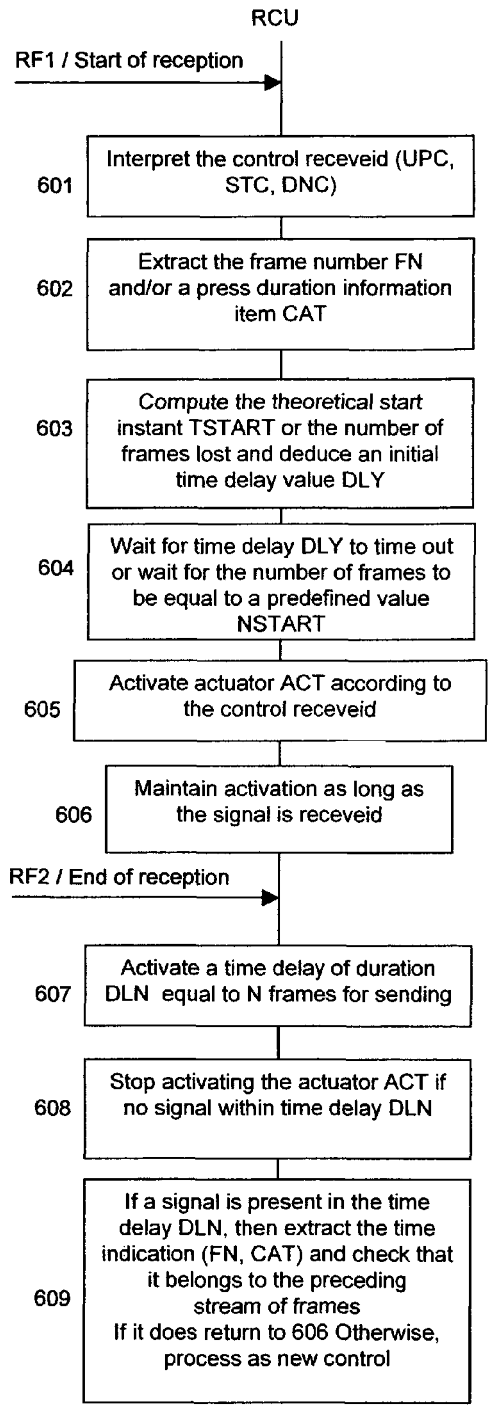
FIG. 6 represents a block diagram of a synchronization method.

FIG. 6 describes the synchronization method represented in FIG. 3, starting with the reception RF1 of a first frame received. This method is executed by each unit similar to the reception unit RCU and for which the transmission unit TRU is an authorized unit. To simplify, the authentication steps are not represented.

In a step 601, the control contained in this first frame is extracted, decoded and interpreted. However, it is not immediately executed.

In the next step 602, the reception unit. RCU extracts from the frame the time information formed either by the frame number FN or the press duration information CAT.

The step 603 activates the computation of the theoretical sending start instant TSTART described previously. The reception unit then knows what duration must be measured between the current instant and the control activation instant.

In the step 604, the reception unit waits for the above duration to elapse. If necessary, other frames received during this time delay confirm or correct the duration.

In the step 605, the delay being reached, the actuator ACT is activated, in the direction corresponding to the control received. All the actuators connected to different units therefore start roughly at the same instant, even for remote units not having received several frames.

In the step 606, the activation is maintained as long as the signal is received.

The next two steps correspond to the case where the method behaves as represented in FIG. 2, when the transmission is corrupted while the control is already activated.

The non-radio reception of the signal is represented by the arrow RF2.

This non-reception initiates the step 607 in which a time delay DLN is activated.

The step 608 tests the reception of a signal during this time delay. The non-reception of a new frame during this duration will be considered as an effective stop of sending at the start of the time delay DLN. Also, the reception unit then stops activating the actuator.

Preferably, the duration DLN is chosen to be equal to the duration DLY: thus, the delay taken for starting is automatically compensated.

However, the situation can also be differentiated according to whether the signal received originates from a transmission unit TRU controlled by a logic control system or controlled by a human user.

In the former case, it is preferable to compensate the time delay duration DLY with the time delay duration DLN. In the second case, the user stops pressing on the control key when in the required situation. The delay taken on starting is unimportant with regard to the current situation. It is then preferable simply to compensate DLN, if necessary, with a reverse movement of the same duration.

The step 609 is initiated if, during the time delay DLN, a new valid signal is sensed. The step includes a validity test regarding whether the signal belongs to the preceding stream of frames. This test is applied not only to the code of the control sent, but also, and above all, to the time indication contained in the frame. Based on this time indication (frame number and/or press duration) and the time elapsed in the time delay DLN, the reception unit RCU determines whether the new frame received indeed belongs to the preceding stream of frames, interrupted by poor conditions, or if it is a new control. If it is still the continuation of the same control, the step 606 is repeated. Otherwise, it is a new control, which is processed as such, with, if necessary, the actuator being stopped.

Figure 7:
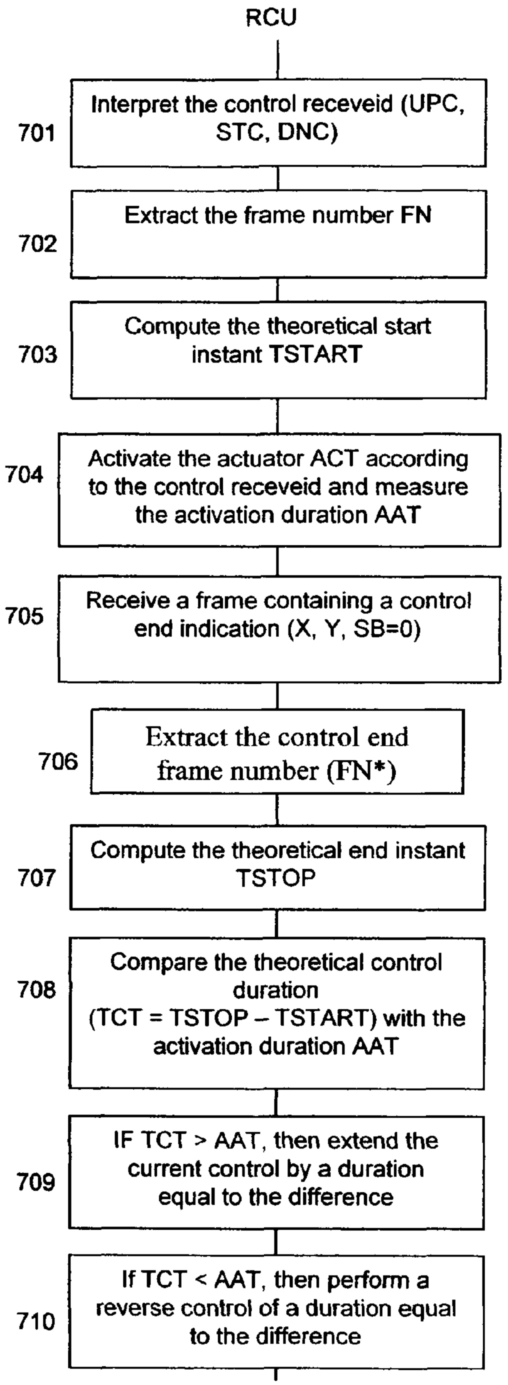
FIG. 7 represents a block diagram of a synchronization method variant.

FIG. 7 represents a synchronization method according to a second embodiment of the invention, in which there is no desire to obtain synchronized operation of actuators obeying one and the same general command, but in which it is desired for the moving elements MOB driven by these actuators to be subject to an identical displacement, or at least a very similar displacement, after a control. The displacements are then matched by correction at end of movement.

This correction incorporates both the effects of poor reception at the start of sending and of poor reception at the end of sending.

In FIG. 7, the time information item consists of the control frame number FN and the control end frame number FN*.

In the step 701, the control received is interpreted, as in the step 601.

In the step 702, the frame number is extracted for use in the step 703 to determine the theoretical sending start instant TSTART.

Unlike the method of FIG. 6, this time the actuator is activated directly in the step 704 according to the control received. In this step 704, the reception unit also activates a measurement of the actuator activation duration AAT, using the clock CK. The order of the steps 703 and 704 can be swapped.

In the step 705, a signal interpreted as forming a control end frame (of type F12 or F32) is received. The control end frame number FN* is extracted in the step 706, and used to compute the theoretical end of sending instant TSTOP.

The different phases described above are also represented in the right-hand part of FIG. 3, in which the first control end frame UPC* is received correctly. The interpretation takes place at the instant T3 from which the instant TSTOP is identified and at which the actuator activation duration AAT is measured.

In the step 707 of the correction method, the reception unit RCU computes the theoretical control duration TCT (difference between the theoretical sending end and sending start instants TSTOP and TSTART) and compares it with the actuator activation duration AAT.

The step 709 is executed if the theoretical control duration is greater than the activation duration. It is then necessary to extend the latter by a value equal to the difference.

The step 710 is executed if the theoretical control duration is less than the activation duration. It is then necessary to stop the current operation and undertake a reverse operation of the actuator of a duration equal to the difference.

Figure 8:
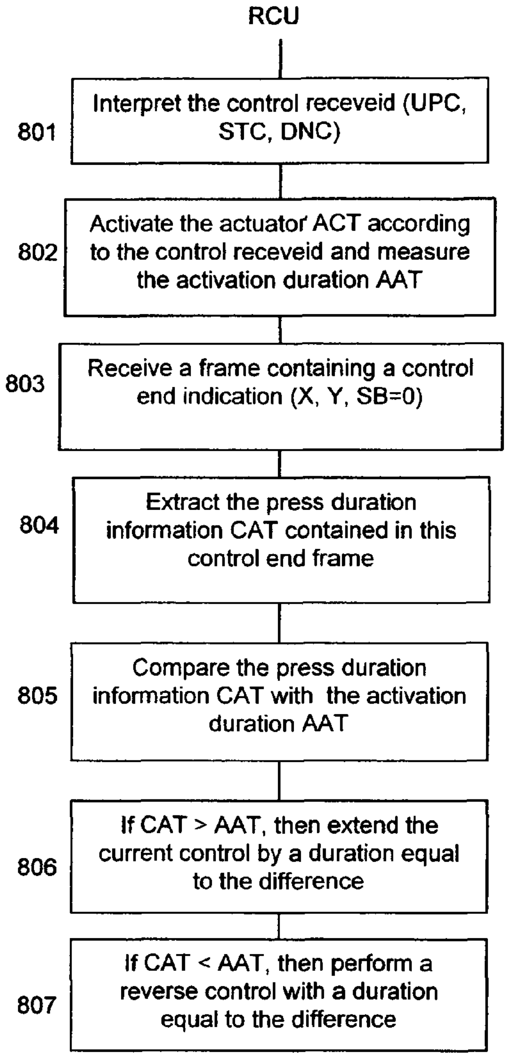
FIG. 8 represents a block diagram of a correction method variant.

FIG. 8 represents a variant of the synchronization method described above. In this variant, the time information item used is the indication of the duration of the press on the control key CAT. The variant therefore applies to frames as shown in FIG. 4B or FIG. 4D.

After a step 801 for interpretation of the control received in a first frame correctly received, the actuator is directly activated according to the control received, during the next step 802. As in the step 705, this activation of the actuator is accompanied by that of a clock measuring the activation duration AAT.

In the step 803, a new frame is received, this time containing an end of control indication, like the frames F22 or F42 of FIG. 4. The reception unit then switches to the step 805 in which the time information item CAT contained in this end of control frame is extracted. It then has the actual press duration, which is compared to the activation duration AAT during the step 805. In the step 806, if the key press duration CAT is greater than the actuator activation duration AAT, then the current control is extended by a duration equal to the difference.

In the step 807, if the key press duration CAT is less than the actuator activation duration AAT, then the current control is stopped. The reception unit then activates a reverse direction control of a duration equal to the difference. The steps 806 and 807 therefore include the computation of the instant at which application of the control applied in the step 802 ends.

Figure 9:
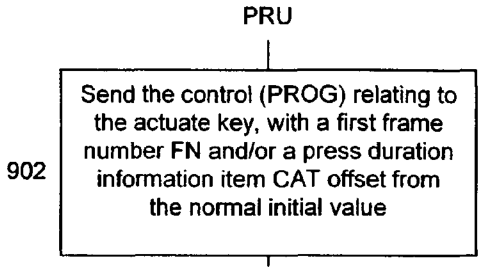
FIG. 9 represents a step of a programming method.

FIG. 9 now represents a method of programming according to a third embodiment of the invention. The method applies to the programming unit PRU, and more particularly to the programming controls that can be sent from this unit while being compatible with programming controls sent from transmission units TRU. The press on a particular PRU key provokes the sending of the control PROG. The programming method differs from the sending method of FIG. 5 solely by the content of the step 502. In FIG. 9, the corresponding step 902 is the only one shown, the steps 901 and 903-906 being like the steps 501 and 503-506 of FIG. 5.

In the step 902, the time indication introduced into the frame is deliberately offset by a quantity equivalent to the press time needed for confirmation of the control PROG by the receiver. For example, the initial press duration information item is introduced as being equal to 10 seconds, although the press has only just begun. Alternatively, the number of frames is set to the initial value 100 (for frames of 100 ms duration). In the subsequent steps, it is this initial value different from the normal initial value that is incremented.

Thus, the reception unit RCU receiving such a signal and provided with the means and methods described above, considers that the press duration satisfies the required criteria and immediately accepts the programming control PROG.

The invention claimed is:

1. A method of synchronizing actuator control, comprising the generation of a control to be executed, the sending of a wireless signal repeating a command frame including a code of the control to be executed and the reception of this signal, which comprises:

- a step for inserting into the sent command frame a time information item representative of the control generation duration between a generation start instant and a generation end instant, the information item changing from a first sent command frame to a second sent command frame,
- a step for extracting this time information item,
- a step for computing at least one of an application start instant and an application end instant of the control, using the time information item;

wherein the method is used for remotely controlling the activation of an actuator or several actuators as long as the generation of the control lasts, said actuators driving at least one of:

- a moving device of closure (door, gate or window) in a building,
- a solar protection,
- a multimedia projection screen,
- a ventilation hatch.

2. The control method as claimed in claim 1, wherein the time information item is a frame number.

3. The control method as claimed in claim 1, wherein the time information item is a number representative of the control generation duration.

4. A method of synchronizing actuator control as claimed in claim 1, wherein the step for computing the at least one of application start instant and application end instant of a control using the time information item includes a step for computing a theoretical control generation start instant and wherein the control application start instant is determined by applying a predetermined time offset to the theoretical control generation instant.

5. The method of synchronizing actuator control as in claim 4, wherein the step for inserting into the frame sent a time information item representative of the control generation duration also includes the insertion of a control generation end indication and wherein the step for computing at least one of the application start instant and application end instant of a control using the time information item comprises:

- a step for activating the actuator according to the control received and for measuring the activation duration,
- a step for receiving a control generation end indication,
- a step for extracting data for determining the control generation duration until the end of control generation (TCT, CAT),
- a step for comparing the control generation duration up to the end of the control generation with the activation duration.

6. The method of synchronizing actuator control as in claim 5, wherein, depending on the result of the comparison step:

- a step for extending the control application duration is undertaken when the activation duration is less than the control generation duration, or
- a correction step terminates application of the current control and provokes a temporary application of a reverse effect control.

7. The method of synchronizing actuator control as in claim 6, wherein the duration of the extension step or the duration of the correction step is equal to the absolute difference of the quantities compared in the comparison step.

8. A method of programming for a unit for programming actuators driving a moving device of a building of closure (door, gate or window), solar protection, multimedia projection screen, or ventilation flap type, which includes the steps of the method of claim 1, and wherein the time information item contained in the initial frame presents a particular value.

9. The programming method as claimed in the claim 8, wherein the particular value corresponds to at least the duration of generation of a control needed to validate the reception of a programming control.

10. An installation comprising a radio frequency remote control transmitter, a radio frequency remote control receiver connected to an actuator driving a moving device of the building of closure (door, gate or window), solar protection, multimedia projection screen, or ventilation flap type, in which a prolonged press on a control key of the transmitter provokes the repeated sending of a frame containing a code of the control key pressed and in which the reception of said frames provokes an action of the receiver on the actuator related to the frame reception duration, wherein the transmitter executes a step for inserting into the frame sent a time information item representative of a control generation duration, the time information item changing from a first frame to a second frame and wherein the receiver executes a step for extracting this time information item, a step for computing at least one of an application start instant and an application end instant of the control and using the at least one of the application start instant and application end instant to create a control to be applied to the actuator.

11. An installation comprising a radio frequency remote control transmitter, a radio frequency remote control receiver connected to an actuator driving a moving device of a building of closure (door, gate or window), solar protection, multimedia projection screen, or ventilation flap type, in which a prolonged press on a control key of the transmitter provokes the repeated sending of a frame containing a code of the control key pressed and in which the reception of said frames provokes an action of the receiver on the actuator related to the frame reception duration, wherein the transmitter executes a step for inserting into the frame sent a time information item representative of a control generation duration, the time information item changing from a first frame to a second frame and wherein the receiver executes a step for extracting this time information item, a step for computing at least one of an application start instant and an application end instant of the control which includes a step for computing the theoretical control generation start instant and wherein the control application start instant is determined by applying a predetermined time offset to the theoretical control generation start instant, and using the at least one of the application start instant and application end instant to create a control to be applied to the actuator.

12. An installation comprising a radio frequency remote control transmitter, a radio frequency remote control receiver connected to an actuator driving a moving device of a building of closure (door, gate or window), solar protection, multimedia projection screen, or ventilation flap type, in which a prolonged press on a control key of the transmitter provokes the repeated sending of a frame containing a code of the control key pressed and in which the reception of said frames provokes an action of the receiver on the actuator related to the frame reception duration, wherein the transmitter executes a step for inserting into the frame sent a time information item representative of a control generation duration, the time information item changing from a first frame to a second frame, wherein the time information item contained in the initial frame presents a particular value, and wherein the receiver executes a step for extracting this time information item and using it to create the control to be applied to the actuator.

* * * * *